US011851565B2

(12) United States Patent
Yun et al.

(10) Patent No.: US 11,851,565 B2
(45) Date of Patent: Dec. 26, 2023

(54) METHOD OF PREPARING COMPOSITION FOR FORMING POLYIMIDE FILM, COMPOSITION FOR FORMING POLYIMIDE FILM PREPARED THEREFROM, AND USE THEREOF

(71) Applicants: SK Innovation Co., Ltd., Seoul (KR); SK ie technology Co., Ltd., Seoul (KR)

(72) Inventors: Cheol Min Yun, Daejeon (KR); Hye Jin Park, Daejeon (KR)

(73) Assignees: SK Innovation Co., Ltd., Seoul (KR); SK ie technology Co., Ltd., Seoul (KR)

( * ) Notice: Subject to any disclaimer, the term of this patent is extended or adjusted under 35 U.S.C. 154(b) by 0 days.

(21) Appl. No.: 17/897,365

(22) Filed: Aug. 29, 2022

(65) Prior Publication Data
US 2023/0075497 A1  Mar. 9, 2023

(30) Foreign Application Priority Data
Aug. 30, 2021  (KR) .................. 10-2021-0114438

(51) Int. Cl.
| | |
|---|---|
| *C08L 79/08* | (2006.01) |
| *C08J 5/18* | (2006.01) |
| *B32B 27/28* | (2006.01) |
| *B32B 27/20* | (2006.01) |
| *B82Y 30/00* | (2011.01) |

(52) U.S. Cl.
CPC .............. *C08L 79/08* (2013.01); *B32B 27/20* (2013.01); *B32B 27/281* (2013.01); *C08J 5/18* (2013.01); *B32B 2264/102* (2013.01); *B32B 2264/301* (2020.08); *B32B 2307/4026* (2013.01); *B32B 2307/412* (2013.01); *B32B 2457/20* (2013.01); *B82Y 30/00* (2013.01); *C08J 2379/08* (2013.01); *C08K 2201/005* (2013.01)

(58) Field of Classification Search
CPC .......... C08L 79/08; C08J 5/18; C08J 2379/08; C08J 2433/08; C08J 2433/10; B82Y 30/00; B32B 27/20; B32B 27/281; B32B 2264/102; B32B 2264/301; B32B 2307/4026; B32B 2307/412; B32B 2457/20; C08F 122/1006; C08K 2201/005; C08K 3/22
See application file for complete search history.

(56) References Cited

U.S. PATENT DOCUMENTS

| | | | |
|---|---|---|---|
| 11,104,801 B2 | 8/2021 | Kourtakis et al. | |
| 2008/0224366 A1* | 9/2008 | Swei ................. | C08L 79/08 264/331.12 |
| 2021/0171769 A1* | 6/2021 | Lai .................... | C08G 73/1042 |

FOREIGN PATENT DOCUMENTS

| | | | |
|---|---|---|---|
| CN | 104211974 A | * | 12/2014 |
| CN | 105622970 A | * | 6/2016 |
| CN | 111234215 A | | 6/2020 |
| KR | 101986710 B1 | | 6/2019 |
| KR | 1020200130386 A | | 11/2020 |
| WO | 2020189759 A1 | | 9/2020 |

OTHER PUBLICATIONS

Machine translation of KR 101986710 B1. (Year: 2019).*
Machine translation of WO 2020/189759. (Year: 2020).*

* cited by examiner

*Primary Examiner* — John D Freeman
(74) *Attorney, Agent, or Firm* — THE WEBB LAW FIRM (57) ABSTRACT

Provided is a method of preparing a composition for forming a polyimide film which may significantly improve dispersibility of a pigment. Specifically, the method includes preparing a polyamic acid resin in the presence of a pigment dispersion including a blue-based inorganic pigment and a dispersing agent. In addition, an average particle size of the inorganic pigment in the pigment dispersion may be 10 to 100 nm.

18 Claims, 1 Drawing Sheet

METHOD OF PREPARING COMPOSITION FOR FORMING POLYIMIDE FILM, COMPOSITION FOR FORMING POLYIMIDE FILM PREPARED THEREFROM, AND USE THEREOF

CROSS-REFERENCE TO RELATED APPLICATION

This application claims priority to Korean Patent Application No. 10-2021-0114438, filed Aug. 30, 2021, the disclosure of which is hereby incorporated by reference in its entirety.

BACKGROUND OF THE INVENTION

Field of the Invention

The following disclosure relates to a method of preparing a composition for forming a polyimide film, a composition for forming a polyimide film prepared therefrom, and a use thereof.

Description of Related Art

A polyimide film is a material of a substrate, a cover window, and the like of a display device and is attracting attention as a next-generation material which may replace tempered glass. However, in order to apply the polyimide film to a display device, it is essential to improve its inherent yellow index properties and impart colorless and transparent performance. Furthermore, in order to allow the polyimide film to be applied to a foldable or flexible display device, it should be accompanied by the improvement of mechanical properties, and thus, the required performance of the polyimide film for a display device is gradually advancing.

For this, studies for decreasing a CTC effect by combining or changing monomers having various structures continue, but a residual yellow color is still shown, and there is a limitation in that a thicker film has an increased yellow index. In addition, a method of adding a dye or a pigment to the polyimide film has been suggested, but the attempt has a limitation in that though the yellow index properties of a film are improved, light transmittance and haze properties may be deteriorated due to the problems such as dispersibility of a dye and a pigment.

Accordingly, the development of polyimide film technology to further broaden the scope of application, by having excellent optical properties to satisfy all of yellow index, haze, transmittance, and the like without deteriorating intrinsic excellent mechanical properties so that the film may be applied to various display material fields including a cover window replacement material as well as a display device substrate, is needed.

SUMMARY OF THE INVENTION

An embodiment is directed to providing a method of preparing a composition for forming a polyimide film which may significantly improve dispersibility of a pigment.

Another embodiment is directed to providing a polyimide film which may implement excellent mechanical strength, while satisfying the physical properties of both a low yellow index and a low haze value to implement excellent optical properties, Still another embodiment is directed to providing a polyimide film which may replace tempered glass and the like and an image display device including the same.

In one general aspect, a method of preparing a composition for forming a polyimide film includes: preparing a polyamic acid resin in the presence of a pigment dispersion including a blue-based inorganic pigment and a dispersing agent, wherein an average particle size of the inorganic pigment in the pigment dispersion is 10 to 100 nm.

The solid phase average particle size of the inorganic pigment according to an exemplary embodiment may be 10 to 70 nm.

The inorganic pigment according to an exemplary embodiment may be included at 10 to 1,500 ppm, based on a polyamic acid solid content.

The pigment dispersion according to an exemplary embodiment may include the inorganic pigment and the dispersing agent at a weight ratio of 1:0.01 to 1:1.

The blue-based inorganic pigment according to an exemplary embodiment may include a natural mineral; or one or more metals selected from zinc, titanium, lead, iron, copper, chromium, cobalt, molybdenum, manganese, and aluminum, or metal oxides thereof.

A maximum absorption wavelength of the inorganic pigment according to an exemplary embodiment may be 520 to 650 nm.

The polyamic acid resin according to an exemplary embodiment may include a structural unit derived from a diamine and a structural unit derived from a dianhydride.

The method of preparing a composition for forming a polyimide film according to an exemplary embodiment may further include adjusting viscosity by further adding an organic solvent so that Relation 1 is satisfied, after the preparing of a polyamic acid resin in the presence of the pigment dispersion:

$$5{,}000 \leq V_{PI} \leq 40{,}000 \qquad \text{[Relation 1]}$$

wherein $V_{PI}$ is a viscosity of the composition for forming a polyimide film when a solid content is 14 wt % with respect to a total weight of the composition for forming a polyimide film, and the viscosity is a viscosity (unit, cp) measured based on 80% torque for 2 minutes using a 52Z spindle at 25° C. with a Brookfield rotational viscometer.

After the preparing of a polyamic acid resin according to an exemplary embodiment, adding an additive may be further included.

The additive according to an exemplary embodiment may include inorganic nanoparticles, polyfunctional (meth)acryl-based compounds, or a combination thereof.

An average diameter of the inorganic nanoparticles according to an exemplary embodiment may be 5 to 50 nm.

The inorganic nanoparticles according to exemplary embodiment may include silica, zirconium oxide, titanium oxide, zinc oxide, zinc sulfide, chromium oxide, barium titanate, or a combination thereof.

The polyfunctional (meth)acryl-based compound according to an exemplary embodiment may further include an alkylene group, an ether group, a urethane group, an ester group, or a combination thereof.

In another general aspect, a composition for forming a polyimide film prepared by the above preparation method is provided.

In another general aspect, a polyimide film obtained by curing the composition for forming a polyimide film is provided.

The polyimide film according to an exemplary embodiment may have a thickness of 20 to 500 µm, a haze in accordance with ASTM D1003 of 2 or less, and a yellow index (YI) in accordance with ASTM E131 of 8 or less.

The polyimide film according to an exemplary embodiment may have a modulus in accordance with ASTM E111 of 5 GPa or more.

In still another general aspect, an image display device includes the polyimide film.

Other features and aspects will be apparent from the following detailed description, the drawings, and the claims.

DESCRIPTION OF THE INVENTION

Hereinafter, an exemplary embodiment will be described in detail so as to be easily practiced by a person skilled in the art to which the present invention pertains. However, the present invention may be implemented in various different forms and is not limited to the exemplary embodiments described herein. In addition, it is not intended to limit the protection scope defined in the claims.

In addition, technical terms and scientific terms used in the present specification have the general meaning understood by a person skilled in the art unless otherwise defined, and description for the known function and configuration obscuring the present invention will be omitted in the following description.

Throughout the present specification, unless explicitly described to the contrary, "comprising" any constituent elements will be understood to imply further inclusion of other constituent elements rather than the exclusion of any other constituent elements.

Hereinafter, unless otherwise particularly defined in the present specification, "polyimide" includes an imide structure, and may be used in the meaning including polyimide or polyamideimide.

Hereinafter, unless otherwise particularly defined in the present specification, a "polyamic acid" refers to a polymer including a structural unit having an amic acid moiety, and a "polyimide" may refer to a polymer including a structural unit having an imide moiety.

Hereinafter, unless otherwise particularly defined in the present specification, a "polyfunctional (meth)acryl-based crosslinked polymer" may refer to a crosslinked polymer formed by crosslinking polyfunctional (meth)acryl-based compounds having a (meth)acryl group to each other, and the polyfunctional (meth)acryl-based crosslinked polymer may include or not include a (meth)acryl group, for example, a (meth)acrylate group.

Hereinafter, unless otherwise particularly defined in the present specification, a "spherical" shape may refer to not only a completely spherical shape in which the surface is substantially equidistant from the center in the ordinary sense, but also a round shape close to a spherical shape having no angle formed.

Hereinafter, unless otherwise particularly defined in the present specification, an "angled amorphous" shape is not particularly limited as long as it is angled particle shape, and may refer to including for example, a polyhedron selected from a tetrahedron, a hexahedron, and an octahedron; a rod shape; a plate shape; and the like.

Hereinafter, unless otherwise defined in the present specification, it will be understood that when a part such as a layer, a film, a thin film, a region, or a plate is referred to as being "on" or "above" another part, it may include not only the case of being "directly on" the other part but also the case of having an intervening part therebetween.

Hereinafter, unless otherwise defined in the present specification, a "combination thereof" refers to a mixture or copolymerization of constituents.

Hereinafter, unless otherwise particularly defined in the present specification, the term "A and/or B" may refer to an embodiment including both A and B or an embodiment selecting one of A and B.

Hereinafter, unless otherwise defined in the present specification, a "polymer" may include an oligomer and a polymer, and may include a homopolymer and a copolymer. The copolymer may include an alternating polymer, a block copolymer, a random copolymer, a branched copolymer, a crosslinked copolymer, or all of them.

In order to apply a polyimide film to a display device, it may be very important to improve the intrinsic yellow index properties of the polyimide film and impart colorless and transparent performance. In order to solve the problem, studies to lower a CTC effect by a combination of monomers having various structures and prepare colorless and transparent polyimide have continued. However, there is a limitation in that a transparent polyimide film manufactured by the method may still show a residual yellow color, and the yellow index is increased with the increased thickness of the film.

Meanwhile, in order to improve yellowness remaining on the transparent polyimide film, a dye or a pigment may be included in the polyimide film. However, even when the yellow index is improved, the light transmittance and the haze properties of the polyimide film are deteriorated due to the dispersibility problem of the dye and the pigment, and thus, a method of preparing a composition for forming a polyimide film in which the haze and transmittance properties are not deteriorated even when the yellow index of the polyimide film is improved is needed.

An exemplary embodiment provides a method of preparing a composition for forming a polyimide film including: preparing a polyamic acid resin in the presence of a pigment dispersion including a blue-based inorganic pigment and a dispersing agent, wherein an average particle size of the inorganic pigment in the pigment dispersion is 10 to 100 nm.

When the pigment is added and dispersed after polymerization of a polyamic acid and/or a polyimide is completed, the pigment may not be dispersed uniformly and the haze properties of the polyimide film may be significantly deteriorated. However, when the pigment and the polyamic acid and/or the polyimide monomer are added together in the polymerization of a polyamic acid and a polyimide, stable dispersibility with the pigment may be secured.

That is, the pigment and the monomer are added together in the polymerization of a polyamic acid and/or a polyimide, thereby significantly improving the dispersibility of the pigment in the composition for forming a polyimide film, and thus, the yellow index may be improved without deteriorating haze and light transmittance even after curing. In addition, the polyimide film according to an embodiment has excellent mechanical properties and flexibility as well as optical properties, and thus, may be useful for a flexible display device.

Specifically, the method of preparing a composition for forming a polyimide film according to an exemplary embodiment may further include preparing a polyamic acid resin in the presence of a pigment dispersion including a blue-based inorganic pigment and a dispersing agent.

That is, the method of preparing a composition for forming a polyimide film according to an exemplary embodiment is characterized by adding the pigment dispersion and the monomer together in the polymerization of a polyamic acid. Accordingly, the dispersibility of the pigment in the composition for forming a polyimide film may be significantly improved, and a polyimide film implementing excellent optical properties may be provided.

Specifically, in an exemplary embodiment, an average particle size of the inorganic pigment in the pigment dispersion may be 30 to 100 nm, more specifically, 50 to 100 nm, and more specifically, 70 to 95 nm. Since the pigment dispersion in which the inorganic pigment is dispersed at the average particle size described above is used, the dispersibility of the pigment in the composition may become better, and the deterioration of the haze and transmittance properties of the polyimide film may be more effectively improved.

In addition, a solid phase average particle size before dispersion of the inorganic pigment according to exemplary embodiment may be 10 to 70 nm, specifically 30 to 70 nm, and more specifically 50 to 70 nm.

That is, in an exemplary embodiment, agglomeration between pigments in the pigment dispersion may be effectively improved, and since the pigment dispersion is added in the preparation of the polyamic acid, the dispersibility of the pigment in the composition for forming a polyimide film may be made excellent. Since the average particle size of the inorganic pigment acts as a factor to determine the optical properties of the polyimide film, for example, transmittance and haze properties, when the agglomeration between pigments is prevented and the solid phase average particle size is maintained, the physical properties to be desired may be implemented. For example, even when the inorganic pigment having the solid phase average particle size as described above is used, in the case in which the pigment is added and dispersed after the polymerization of a polyamic acid and/or a polyimide is completed, the pigment is agglomerated so that the average particle size is rapidly increased, and the haze and transmittance properties of the polyimide film may be significantly deteriorated.

The inorganic pigment according to an exemplary embodiment may be included at 10 to 1,500 ppm, specifically 10 to 1,000 ppm, more specifically 10 to 500 ppm, and still more specifically 10 to 100 ppm, based on a polyamic acid solid content. By including the inorganic pigment in the above range, the optical properties of a film after curing, for example, a yellow index may become better without deteriorating the formulation stability of the composition for forming a polyimide film. Here, the polyamic acid solid content may refer to a polyamic acid and/or a polyimide.

The pigment dispersion according to an exemplary embodiment may include the inorganic pigment and the dispersing agent at a weight ratio of 1:0.01 to 1:1, specifically 1:0.05 to 1:0.5, and more specifically 1:0.05 to 1:0.2, but is not necessarily limited thereto. By using the pigment dispersion mixed at the weight ratio described above, the dispersibility of the pigment in the composition for forming a polyimide film may become better, and the optical properties of the film such as yellow index and haze may be improved.

The blue-based inorganic pigment according to an exemplary embodiment may include, for example, a natural mineral; or one or more metals selected from zinc, titanium, lead, iron, copper, chromium, cobalt, molybdenum, manganese, and aluminum, or metal oxides thereof. More specifically, the blue-based inorganic pigment may include one or more metals selected from cobalt and aluminum or metal oxides thereof, and more specifically, may include metal oxides including cobalt and aluminum.

Specifically, the blue-based inorganic pigment may have a maximum absorption wavelength at 520 to 650 nm, for example, 550 to 650 nm, and for example, 550 to 620 nm.

By using the inorganic pigment having the maximum absorption wavelength in the range described above, the light absorption phenomenon in the blue or violet wavelength of the polyimide film may be effectively offset and the yellow index may be improved more effectively. Furthermore, by appropriately selecting the maximum absorption wavelength range of the inorganic pigment according to the kind and the composition of monomers used in the preparation of the composition for forming a polyimide film or the optical properties of the polyimide film, the optical properties such as refractive index and retardation in the thickness direction as well as the yellow index and the haze of the film may become better.

In addition, the pigment dispersion according to exemplary embodiment may be used by mixing an organic solvent.

Specifically, the pigment dispersion and the organic solvent may be mixed at a weight ratio of 1:99 to 30:70, specifically 5:95 to 10:90, but is not necessarily limited thereto. By using the pigment dispersion mixed with the organic solvent at the weight ratio described above, the dispersibility of the pigment in the composition for forming a polyimide film may become better.

Here, in order to further improve dispersibility, a means such as ultrasound may be used after the pigment dispersion is added to the organic solvent. Though the kind of organic solvent is not particularly limited, an amide-based solvent may be used. The amide-based solvent includes an amide moiety, and for example, may be dimethylpropionamide, diethylpropionamide, dimethylacetylamide, diethylacetamide, dimethylformamide, methylpyrrolidone, ethylpyrrolidone, octylpyrrolidone, or a combination thereof, and specifically, may include dimethylacetylamide.

The dispersing agent according to an exemplary embodiment is not particularly limited as long as it may prevent agglomeration between pigments and improve the dispersibility and the dispersion stability of the pigment, but for example, the dispersing agent may have a functional group having high affinity to a functional group adsorbed to the pigment and a dispersion medium (the organic solvent), and the performance of the dispersing agent may be determined by a balance between the two functional groups. As the dispersing agent, various kinds may be used depending on the surface state of the pigment which is a subject to be dispersed. For example, the pigment dispersing agent according to an exemplary embodiment may have an acidic functional group, and in this case, the acidic functional group may be adsorbed to the pigment. The acidic functional group may be a carboxylic acid.

Since the pigment dispersion according to an exemplary embodiment uses the dispersing agent described above, the dispersibility of the pigment in the composition for forming a polyimide film may become better, and also, the coatability is further improved in further curing and defect production may be prevented.

The polyamic acid and/or the polyimide according to an exemplary embodiment may include a structural unit derived from a diamine compound and a structural unit derived from a dianhydride compound.

The diamine compound according to an exemplary embodiment is not particularly limited as long as it is a compound which may form a polyimide, but for example, may be an aromatic diamine compound. The aromatic diamine compound may be one or a mixture of two or more selected from p-phenylenediamine (PDA), m-phenylenediamine (m-PDA), 4,4'-oxydianiline (4,4'-ODA), 3,4'-oxydianiline (3,4'-ODA), 2,2-bis(4-[4-aminophenoxy]-phenyl)propane (BAPP), 1,4-bis(4-aminophenoxy)benzene (TPE-Q), 1,3-bis(4-aminophenoxy)benzene (TPE-R), 4,4'-bis(4-aminophenoxy)biphenyl (BAPB), bis(4-[4-aminophenoxy]phenyl)sulfone (BAPS), bis(4-[3-aminophenoxy]phenyl)sulfone (m-BAPS), 3,3'-dihydroxy-4,4'-diaminobiphenyl (HAB), 3,3'-dimethylbenzidine (TB), 2,2'-dimethylbenzidine (m-TB), 2,2'-bistrifluoromethylbenzidine (TFMB), 1,4-bis(4-amino-2-trifluoromethylphenoxy)benzene (6FAPB), 2,2'-bis(trifluoromethyl)-4,4'-diaminodiphenylether (6FODA), 1,3-bis(3-aminophenoxy)benzene (APB), 1,4-naphthalenediamine (1,4-ND), 1,5-naphthalenediamine (1,5-ND), 4,4'-diaminobenzanilide (DABA), 6-amino-2-(4-aminophenyl)benzoxazole, and 5-amino-2-(4-aminophenyl)benzoxazole, but is not limited thereto.

Specifically, the aromatic diamine compound may be a fluorine-based aromatic diamine compound to which a fluorine substituent is introduced, and for example, may be selected from 2,2'-bistrifluoromethylbenzidine (TFMB), 1,4-bis(4-amino-2-trifluoromethylphenoxy)benzene (6FAPB), 2,2'-bis(trifluoromethyl)-4,4'-diaminodiphenylether (6FODA), or a combination thereof. Since the fluorine-based aromatic diamine compound described above is used, better optical properties may be imparted to the film due to a charge transfer effect of fluorine substituents. In addition, the mechanical strength of the polyimide film may become better.

The dianhydride according to an exemplary embodiment is not particularly limited as long as it forms a polyimide, but for example, may be an aromatic dianhydride, an alicyclic dianhydride, or a combination thereof.

The aromatic dianhydride may be, for example, one or a mixture of two or more selected from 9,9-bis(3,4-dicarboxyphenyl)fluorene dianhydride (BPAF), 4,4'-(Hexafluoroisopropylidene)diphthalic anhydride (6FDA), biphenyltetracarboxylic dianhydride (BPDA), oxydiphthalic dianhydride (ODPA), sulfonyl diphthalic anhydride (SO$_2$DPA), (isopropylidenediphenoxy)bis(phthalic anhydride) (6HDBA), 4-(2,5-dioxotetrahydrofuran-3-yl)-1,2,3,4-tetrahydronaphthalene-1,2-dicarboxylic dianhydride (TDA), 1,2,4,5-benzene tetracarboxylic dianhydride (PMDA), and benzophenone tetracarboxylic dianhydride (BTDA), but is not limited thereto.

Specifically, the aromatic dianhydride may include biphenyltetracarboxylic dianhydride (BPDA). By using the aromatic dianhydride described above, the optical properties of the polyimide film may be improved, and mechanical strength, in particular, modulus may be improved more effectively.

The alicyclic dianhydride compound may be, for example, any one or a mixture of two or more selected from the group consisting of 1,2,3,4-cyclobutanetetracarboxylic dianhydride (CBDA), 5-(2,5-dioxotetrahydrofuryl)-3-methylcyclohexene-1,2-dicarboxylic dianhydride (DOCDA), bicyclo[2.2.2]oct-7-en-2,3,5,6-tetracarboxylic dianhydride (BTA), bicyclooctene-2,3,5,6-tetracarboxylic dianhydride (BODA), 1,2,3,4-cyclopentanetetracarboxylic dianhydride (CPDA), 1,2,4,5-cyclohexanetetracarboxylic dianhydride (CHDA), 1,2,4-tricarboxy-3-methylcarboxycyclopentane dianhydride (TMDA), 1,2,3,4-tetracarboxycyclopentane dianhydride (TCDA), and derivatives thereof, but is not limited thereto.

More specifically, the polyamic acid resin according to an exemplary embodiment may include a structural unit derived from 2,2'-bistrifluoromethylbenzidine (TFMB), 2,2'-bis(trifluoromethyl)-4,4'-diaminodiphenylether (6FODA), and biphenyltetracarboxylilc dianhydride (BPDA), and since the inorganic pigment having an absorption wavelength of 420 to 580 nm is used together, the yellow index of the polyimide film may be improved more effectively.

In addition, the polyamic acid resin according to an exemplary embodiment may be a polyamideimide which further includes a structural unit derived from an aromatic diacid dichloride. The aromatic diacid dichloride forms an amide structure in a polymer chain, and may make the mechanical properties including a modulus better in a range not deteriorating the optical properties of a film.

The aromatic diacid dichloride may be one or a mixture of two or more selected from the group consisting of isophthaloyl dichloride (IPC), terephthaloyl dichloride (TPC), 1,1'-biphenyl-4,4'-dicarbonyl dichloride (BPC), 1,4-naphthalene dicarboxylic dichloride (NPC), 2,6-naphthalene dicarboxylic dichloride (NTC), 1,5-naphthalene dicarboxylic dichloride (NEC), and derivatives thereof, but is not limited thereto.

Hereinafter, a method of preparing the polyamic acid resin according to an exemplary embodiment will be described in detail.

The method of preparing the polyamic acid resin according to an exemplary embodiment may include: a) adding a pigment dispersion including a blue-based inorganic pigment and a dispersing agent to an organic solvent to prepare a mixed solution; and b) dissolving a diamine in the mixed solution, and then reacting a dianhydride to prepare the polyamic acid resin.

As described above, since the monomer compound and the pigment dispersion are added together in the step of polymerizing a polyamic acid, the dispersibility of the pigment in the composition for forming a polyimide film may be significantly improved, and a polyimide film having excellent optical properties may be provided.

Here, the organic solvent is not particularly limited as long as it is commonly used in polyamic acid polymerization, but for example, may include dimethylpropionamide, dimethylacetylamide, diethylacetamide, dimethylformamide, methylpyrrolidone, ethylpyrrolidone, octylpyrrolidone, or a combination thereof. Specifically, the organic solvent may include dimethylpropionamide.

In step b), the diamine and the dianhydride may be added at a mole ratio of 1:0.9 to 1:1.1. Here, though the polymerization conditions are not particularly limited, it is preferred to carry out a polymerization reaction under an inert gas atmosphere, and as an example, polymerization may be performed with nitrogen or argon gas being refluxed in the reactor. In addition, a reaction temperature may be 10° C. to 50° C. or 20° C. to 40° C., and a reaction time may be 10 hours to 40 hours or 15 hours to 30 hours, but they are not necessarily limited thereto.

In addition, in step b), an aromatic diacid dichloride may be further added. In this case, the diamine, the dianhydride, and the aromatic diacid dichloride may be simultaneously polymerized, or the diamine and the aromatic diacid dichloride are reacted to prepare an oligomer having an amine end, and then the oligomer is reacted with additional diamine and dianhydride to prepare the polyamic acid resin, but is not necessarily limited thereto. When the oligomer having an amine end is prepared and then is reacted with the additional diamine and dianhydride, a block polyamideimide resin may be prepared, and the mechanical properties of the film may be further improved.

A weight average molecular weight (Mw) of the polyamic acid according to an exemplary embodiment is not particularly limited, but may be 10,000 to 100,000 g/mol, 10,000 to 70,000 g/mol, or 10,000 to 60,000 g/mol. By having the weight average molecular weight in the range described above, a film having better optical properties and mechanical strength and less curl may be provided.

In addition, the method of preparing a composition for forming a polyimide film according to an exemplary embodiment may further include adjusting viscosity by further adding an organic solvent so that Relation 1 is satisfied, after the preparing of a polyamic acid resin in the presence of the pigment dispersion:

$$5,000 cp \leq V_{PI} \leq 40,000 cp \quad \text{[Relation 1]}$$

wherein $V_{PI}$ is a viscosity of the composition for forming a polyimide film when a solid content is 14 wt % with respect to a total weight of the composition for forming a polyimide film, and the viscosity is a viscosity (unit, cp) measured based on 80% torque for 2 minutes using a 52Z spindle at 25° C. with a Brookfield rotational viscometer.

Here, the solid content may be a polyamic acid and/or a polyimide, and when organic nanoparticles described later are included, the solid content means that a polyamic acid and/or a polyimide, and inorganic nanoparticles are included.

Specifically, the viscosity ($V_{PI}$) of the composition for forming a polyimide film may be 40,000 to 50,000, 30,000 to 40,000, or 10,000 to 30,000, and it may mean that the inorganic pigment is stably dispersed in the composition. In addition, without being bound to a certain theory, since the viscosity value in the above range is satisfied, application to a thin film process in forming a film may be advantageous, coatability is further improved, and defect production may be prevented. Specifically, defects occurring in a coating process, for example, surface unevenness may be effectively prevented, the packing density of the polyimide film is lowered and the film becomes amorphous, thereby further improving optical properties.

In addition, the method of preparing a composition for forming a polyimide film according to an exemplary embodiment may further include adding an additive after the preparing of a polyamic acid resin.

The additive according to an exemplary embodiment may include inorganic nanoparticles, polyfunctional (meth)acryl-based compounds, or a combination thereof.

Specifically, in an exemplary embodiment, when the additive is further included, the method of preparing a composition for forming a polyimide film may include: a) adding a pigment dispersion including a blue-based inorganic pigment and a dispersing agent to an organic solvent to prepare a mixed solution; b) dissolving a diamine in the mixed solution, and then reacting a dianhydride to prepare a polyamic acid resin; and c) adding inorganic nanoparticles and/or a polyfunctional (meth)acryl-based compound to the polyamic acid resin.

It may be more preferred to add the inorganic nanoparticles according to an exemplary embodiment in an organic solution state which is dispersed by a means such as ultrasound after adding the inorganic nanoparticles to the organic solvent, in order to improve dispersibility. In addition, when surface-treated inorganic nanoparticles of which the surface is modified are added, dispersibility may be further improved.

The inorganic nanoparticles according to an exemplary embodiment may include spherical inorganic nanoparticles, angled amorphous inorganic nanoparticles or a combination thereof, and when only spherical inorganic nanoparticles are included, the effect to be desired in the present invention may be implemented more effectively, but is not necessarily limited thereto.

When the inorganic nanoparticles are further included in an exemplary embodiment, a bridge between the polyamic acid resin and the inorganic nanoparticles is derived by a means such as heating to form a crosslink, and the crosslink may be crosslinking of all or part of the inorganic nanoparticles, but the present invention is not necessarily limited thereto.

The inorganic nanoparticles are nano-sized particles, and the size may be 50 nm or less, and for example, 30 nm or less, for example, 20 nm or less as an average diameter, but is not necessarily limited thereto. More specifically, the size of the inorganic nanoparticles may be 5 to 50 nm, more specifically 5 to 30 nm, and still more specifically 5 to 20 nm as the average diameter, but is not necessarily limited thereto.

The inorganic nanoparticles may be included at 20 to 65 parts by weight, for example, 20 to 50 parts by weight, for example, 25 to 50 parts by weight, with respect to 100 parts by weight of the polyamic acid and/or polyimide solid content. By satisfying the average particle diameter and the content in the ranges described above, the crosslinking may be implemented better, and the visibility, the transparency, and the like of the film may be further improved, within a range not deteriorating the mechanical and thermal physical properties of the film.

The inorganic nanoparticles according to an exemplary embodiment may include, for example, silica, zirconium oxide, titanium oxide, zinc oxide, zinc sulfide, chromium oxide, barium titanate, or a combination thereof, and more specifically, may be silica, but is not limited thereto. By further including the inorganic nanoparticles, the optical properties of the film, in particular, a total light transmittance measured at 400 to 700 nm in accordance with the standard of ASTM D1003 is further improved to have more improved viewing properties. In addition, since the transparency may be more significantly improved with the lowered refractive index, and the modulus is more improved, the film may have better mechanical properties.

The polyfunctional (meth)acryl-based compound is a compound having a polyfunctional (meth)acryl group, and the (meth)acryl group may be, for example, a (meth)acrylate group. In addition, the polyfunctional (meth)acryl-based compound may further include an alkylene group, an ether group, a urethane group, an ester group, or a combination thereof.

Specifically, the polyfunctional (meth)acryl-based compound may include trimethylolpropanetri(meth)acrylate, trimethylolethanetri(meth)acrylate, 1,2,4-cyclohexanetetra (meth)acrylate, pentaerythritoltetra(meth)acrylate, pentaerythritoltri(meth)acrylate, dipentaerythritoltri(meth)acrylate, dipentaerythritolpenta(meth)acrylate, dipentaerythritoltetra(meth)acrylate, dipentaerythritolhexa (meth)acrylate, tripentaerythritoltri(meth)acrylate, tripentaerythritolhexa(meth)acrylate, urethane (meth)acrylate oligomer, polyester (meth)acrylate oligomer, or a combination thereof, and for example, may include dipentaerythritolhexa (meth)acrylate, pentaerythritoltetra(meth)acrylate, urethane (meth)acrylate oligomer, polyester (meth)acrylate oligomer, or a combination thereof, but is not necessarily limited thereto.

The polyfunctional (meth)acryl-based compound according to an exemplary embodiment may form a polyfunctional (meth)acryl-based crosslinked polymer later by a means such as heating, and the crosslinked polymer may be formed by crosslinking all or a part of the polyfunctional (meth) acryl-based compound, but is not necessarily limited thereto. In addition, the polyfunctional (meth)acryl-based crosslinked polymer may be dispersed in the composition for forming a polyimide film to form a composite. However, a bond in the polyfunctional (meth)acryl-based crosslinked polymer or a bond in the polyimide polymer may not include a chemical bond, and for example, the polyfunctional (meth) acryl-based crosslinked polymer and the polyimide polymer may not be covalently bonded to each other.

The polyfunctional (meth)acryl-based compound may be included at 1 to 50 parts by weight, for example, 1 to 40 parts by weight, for example, 20 to 40 parts by weight, with respect to 100 parts by weight of the polyamic acid and/or polyimide solid content. By further including the polyfunctional (meth)acryl-based compound in the range described above, while flexible properties are implemented, a phenomenon in which the surface hardness and the impact resistance in a trade-off relationship with the flexible properties are deteriorated may be significantly improved. In addition, the optical properties are also further improved, so that the film may be appropriate for use as a cover window of a flexible display panel.

Another exemplary embodiment may be a polyimide film manufactured from the composition for forming a polyimide film.

The polyimide film according to an exemplary embodiment may have a thickness satisfying 20 to 500 μm, for example 30 to 300 u μm, or for example 50 to 100 μm. In addition, the polyimide film according to an exemplary embodiment may have a haze in accordance with ASTM D1003 of 2 or less, for example, 1 or less, for example, 0.7 or less. In addition, the polyimide film according to an implementation may satisfy the haze described above, and also satisfy the physical properties of a yellow index (YI) in accordance with ASTM E131 of 8 or less, for example, 7 or less, for example, 6 or less. That is, the polyimide film according to an exemplary embodiment may have a significantly improved yellow index, without deteriorating haze.

In addition, the polyimide film satisfies the physical properties as described above, and also, may have a total light transmittance of 80% or more, more specifically 85% or more, and still more specifically 90% or more as measured at 400 to 700 nm in accordance with the standard of ASTM D1003, but is not necessarily limited thereto. By satisfying a high light transmittance in the above range, the polyimide film according to an exemplary embodiment has significantly improved viewing properties, and when it is applied to a window cover film, further improved viewing properties may be expressed.

In addition, the polyamide film according to an exemplary embodiment may have a modulus of 5.0 GPa or more, for example, 6.0 GPa or more, for example, 5.0 to 10.0 GPa, or for example, 6.0 to 10.0 GPa as measured at an extension speed of 50 mm/min using UTM 3365 available from Instron, but is not necessarily limited thereto as long as the object of the present invention is achieved. By satisfying the physical properties of modulus in the above range, the polyimide film according to an exemplary embodiment satisfies all of mechanical, thermal, and electrical properties, in that it may have significantly improved optical properties and also have mechanical properties which are not deteriorated at all as compared with the conventional polyimide-based film, and thus, has a further higher value for use.

In addition, the polyimide film may have a retardation in the thickness direction ($R_{th}$) of 3500 nm or less, for example, 3000 nm or less, and more specifically, 1000 to 2500 nm, at a thickness of 50 μm, but is not necessarily limited thereto. By having the retardation in the above range, the polyimide film according to an exemplary embodiment has significantly excellent visibility and appearance quality, and thus, may provide optical properties which are very appropriate for use in various fields including a display. Herein, the retardation in the thickness direction ($R_{th}$) refers to a value of the retardation in the thickness direction at a wavelength of 550 nm, derived by the following Calculation Formula 1:

$$R_{th} = \left[\frac{nx + ny}{2} - nz\right] * d \qquad \text{[Calculation Formula 1]}$$

wherein nx is a refractive index in a x direction, ny is a refractive index in a y direction, nz is a refractive index in a z direction, and d is a thickness (μm) of the polyamide-imide film.

Therefore, the polyimide film according to an exemplary embodiment may satisfy an excellent light transmittance and a low retardation in the thickness direction ($R_{th}$) as mentioned above, and may implement significantly low yellow index and haze values which are significantly lower than those of a conventional polyimide film, and thus, has surprisingly improved optical properties.

In addition, another exemplary embodiment may be an image display device including the polyimide film.

Here, the image display device is not particularly limited as long as it belongs to fields requiring excellent optical properties, and specifically, for example, may be any one or more selected from a liquid crystal display device, an electroluminescence display device, a plasma display device, a field emission display device, and the like, but is not limited thereto.

Hereinafter, a method of manufacturing a polyimide film according to an exemplary embodiment will be described in detail.

The method of manufacturing a polyimide film according to an exemplary embodiment may include: a) an application step of applying the composition for forming a polyimide film described above on a substrate; and b) a curing step of curing the composition for forming a polyimide film by drying and heating.

Specifically, in step a), the composition for forming a polyimide film is applied on a substrate such as glass, and the application method is not limited as long as it is commonly used in the art. A non-limiting example thereof may include knife coating, dip coating, roll coating, slot die coating, lip die coating, slide coating, curtain coating, and the like, and the same or different kinds of applications may be successively applied once or more thereto, of course.

In addition, the substrate may be used without limitations as long as it is commonly used in the art, and a non-limiting example thereof may include glass; stainless steel; or plastic films such as polyethylene terephthalate, polyethylene naphthalate, polypropylene, polyethylene, cellulose triacetate, cellulose diacetate, poly(meth)acrylate alkyl ester, poly (meth)acrylate ester copolymer, polyvinyl chloride, polyvinyl alcohol, polycarbonate, polystyrene, cellophane, polyvinylidene chloride copolymer, polyamide, polyimide, vinyl chloride/vinyl acetate copolymer, polytetrafluoroethylene, polytrifluoroethylene, and the like, but is not limited thereto.

In step b) according to an exemplary embodiment, the drying is for removing the solvent present in the composition for forming a polyimide film, and may be performed at 30 to 80° C., 40 to 80° C., or 50 to 80° C., but is not necessarily limited thereto.

The thermal curing according to an exemplary embodiment may be performed at 80 to 450° C., 80 to 400° C., or 80 to 350° C.

Specifically, the thermal curing may be performed at 80 to 100° C. for 1 minute to 2 hours, at higher than 100° C. to 200° C. for 1 minute to 2 hours, or at higher than 200° C. to 450° C. for 1 minute to 2 hours, and stepwise thermal curing may be performed under two or more temperature conditions selected therefrom. More specifically, the thermal curing may be performed at 80 to 100° C. for 1 minute to 2 hours, and then performed at higher than 200° C. to 450° C. or at higher than 300° C. to 450° C. for 1 minute to 2 hours. In addition, the thermal curing may be performed in a separate vacuum oven, an oven filled with inert gas, or the like, but is not necessarily limited thereto.

In addition, the curing step may also be performed by chemical curing.

The chemical curing may be performed using an imidization catalyst, and a non-limiting example of the imidization catalyst may include any one or two or more selected from pyridine, isoquinoline, β-quinoline, and the like, but is not necessarily limited thereto.

The method of manufacturing a polyimide film according to an exemplary embodiment may further include a standing step of applying the composition for forming a polyimide film on the substrate, and then allowing it to stand at room temperature, if necessary.

The optical properties on the film surface may be maintained more stable by the standing step. Without being bound to a certain theory, when a conventional composition for forming a polyimide film is subjected to the standing step as such before curing, the solvent absorbs moisture in the air, the moisture diffuses inside and collides with the polyamic acid and/or polyimide to cause cloudiness from the film surface, and agglomeration occurs to cause coating unevenness. However, the composition for forming a polyimide film according to an exemplary embodiment has no cloudiness and agglomeration even when allowed to stand in the air for a long time, and may secure a film having improved optical properties.

The standing step may be performed at room temperature and/or in a high humidity condition. Here, the room temperature may be 40° C. or lower, for example, 30° C. or lower, for example, 25° C. or lower, more specifically, 15° C. to 25° C., and particularly preferably, 20 to 25° C. In addition, high humidity may be a relative humidity of 50% or more, for example, 60% or more, for example, 70% or more, and for example, 80% or more. The standing step may be performed for 1 minute to 3 hours, for example, for 10 minutes to 2 hours, and for example, for 20 minutes to 1 hour.

In the method of manufacturing a polyimide film according to an exemplary embodiment, one or two or more additives selected from a flame retardant, adhesive strength improver particles, an anti-oxidant, a UV blocking agent, a plasticizer, and the like are mixed with the polyamic acid solution to manufacture the polyimide film.

Hereinafter, an example will be described for describing an exemplary embodiment in detail, but the present invention is not limited to the following examples.

In the following experimentation, the physical properties were measured as follows.

<Average Particle Size of Inorganic Pigment in Pigment Dispersion>

A pigment dispersion (NV=20 wt %) diluted 4 times in a DMAc solvent was used as a sample, and equipment available from Microtrac [nanotrac UPA-EX150] was used to measure an average particle size (D50 value).

<Weight Average Molecular Weight>

A weight average molecular weight was measured by dissolving a film in a DMAc eluent containing 0.05 M LiCl. GPC was performed using Waters GPC system, Waters 1515 isocratic HPLC Pump, and Waters 2414 Refractive Index detector, by connecting Olexis, Polypore and mixed D columns as a column, using polymethylmethacrylate (PMMA STD) as a standard material, and analysis was performed at 35° C. at a flow rate of 1 mL/min.

<Viscosity ($V_{PI}$)>

0.5 ul of a composition for forming a polyimide film (solid content of 14 wt %) was put in a container with a plate rheometer (Brookfield, LVDV-1II Ultra), a spindle was lowered and rpm was adjusted, and after standby for 2 minutes when reaching a torque of 80%, a viscosity value when there was no torque change was measured. At this time, the viscosity was measured under the temperature condition of 25° C., using a 52Z spindle. The unit was cp.

<Haze>

Measurement was performed using a spectrophotometer (from Nippon Denshoku, COH-400) in accordance with the standard of ASTM D1003.

<Yellow Index (YI)>

Measurement was performed using a spectrophotometer (Nippon Denshoku, COH-5500) in accordance with the standard of ASTM E313.

<Total Light Transmittance (T.T.)>

A total light transmittance was measured in the entire wavelength region of 400 to 700 nm, using a spectrophotometer (Nippon Denshoku, COH-5500), in accordance with the standard of ASTM D1003. The unit was %.

Example 1

Preparation of Composition for Forming Polyimide Film

An agitator in which a nitrogen stream flows was filled with a solvent in which 253 g of dimethylpropionamide (DMPA) and 1,200 ppm of a pigment dispersion (5 wt % in DMAc, OP-1803B, Toyoink) having an average particle size of a pigment in the dispersion of 90 nm are mixed. While the temperature of a reactor was maintained at 25° C., 29.79 g of 2,2'-bistrifluoromethylbenzidine (TFMB) and 3.47 g of 6 FODA were dissolved. Here, 30 g of 9,9-bis(3,4-dicarboxyphenyl)fluorene dianhydride (BPDA) was added at 25° C. and dissolved therein for 24 hours with stirring to prepare a polyamic acid resin. Thereafter, a DMPA solvent was added so that the solid content of the polyamic acid was 14 wt % based on the total weight to prepare Composition 1 for forming a polyimide film.

Manufacture of Polyimide Film

Composition 1 for forming a polyimide film obtained above was applied on one surface of a glass substrate (1.0 T) with an applicator, cured by heating at 80° C. for 30 minutes and then 300° C. for 15 minutes under a nitrogen stream, and then peeled off from the glass substrate, thereby obtaining a polyimide film of Example 1 having a thickness of 57 µm. The physical properties are shown in the following Table 1.

Example 2

In Example 1, after preparing the polyamic acid resin, 30 parts by weight of inorganic nanoparticles (SSD 330T, 30 wt % in DMAc, Lenko, 15 nm) and 10 parts by weight of dipentaerythritol hexaacrylate (M500 Miwon Specialty Chemical) were added, and stirring was performed for 5 hours, thereby preparing Composition 2 for forming a polyimide film and manufacturing a polyimide film of Example 2 having a thickness of 57 µm. The physical properties are shown in the following Table 1.

then 29.79 g of 2,2'-bistrifluoromethylbenzidine (TFMB) and 3.47 g of 6FODA were dissolved therein in a state in which the temperature of the reactor was maintained at 25° C. Here, 30 g of 9,9-bis(3,4-dicarboxyphenyl)fluorene dianhydride (BPDA) was added at 25° C. and dissolved therein for 24 hours with stirring to prepare a polyamic acid resin. Thereafter, a DMPA solvent was added so that the solid content of the polyamic acid was 14 wt % based on the total weight to prepare Composition C for forming a polyimide film.

Manufacture of Polyimide Film

Composition C for forming a polyimide film obtained above was applied on one surface of a glass substrate (1.0 T) with an applicator, cured by heating at 80° C. for 30 minutes and then 300° C. for 15 minutes under a nitrogen stream, and then peeled off from the glass substrate, thereby obtaining a polyimide film of Comparative Example 3 having a thickness of 57 µm.

TABLE 1

|  |  | Example 1 | Example 2 | Comparative Example 1 | Comparative Example 2 | Comparative Example 3 |
| --- | --- | --- | --- | --- | --- | --- |
| 5 wt % pigment dispersion | Pigment average particle size (nm) in dispersion | 90 | 90 | 90 | 151 | — |
|  | Content (ppm, based on polyamic acid) | 1,200 | 1,200 | 1,200 | 1,200 | 0 |
| Thickness (um) |  | 57 | 57 | Unable to produce film | 57 | 57 |
| Haze (%) |  | 0.61 | 0.2 |  | 1.1 | 1.3 |
| T.T. (%) |  | 89.5 | 90.2 |  | 89.8 | 89.6 |
| YI |  | 3.97 | 2.98 |  | 4.78 | 4.56 |

Comparative Example 1

Preparation of Composition for Forming Polyimide Film

An agitator in which a nitrogen stream flowed was filled with 253 g of N,N-dimethylpropionamide (DMPA), and then 29.79 g of 2,2'-bistrifluoromethylbenzidine (TFMB) and 3.47 g of 6FODA were dissolved therein in a state in which the temperature of the reactor was maintained at 25° C. 30 g of 9,9-bis(3,4-dicarboxyphenyl)fluorene dianhydride (BPDA) was added thereto and was dissolved therein for 24 hours with stirring to prepare a polyamic acid resin. Thereafter, 1,200 ppm of the pigment dispersion (5 wt % in DMAc, OP-1803B, Toyoink) was added, a DMPA solvent was added so that the polyamic acid solid content was 14 wt % based on the total weight, thereby preparing Composition A for forming a polyimide film.

Figure 1:
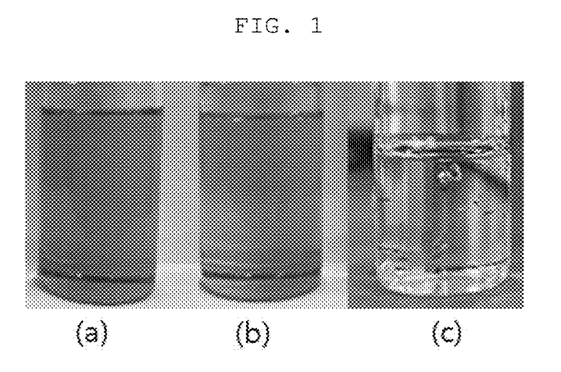
FIG. 1 is photographs of compositions for forming a polyimide film according to (a) Example 1, (b) Comparative Example 2, and (c) Comparative Example 1.
Figure 2:
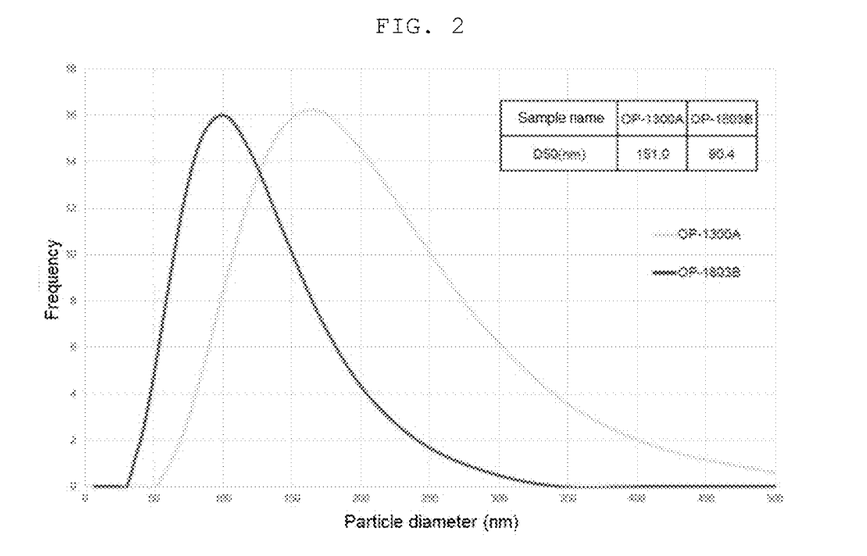
FIG. 2 shows the results of measuring a pigment average particle size in a pigment dispersion used in the examples and the comparative examples.

As shown in (c) of FIG. 1, the pigment was not dispersed at all in the composition for forming a polyimide film of Comparative Example 1, and the film was unable to be produced.

Comparative Example 2

Composition B for forming a polyimide film and the polyimide film of Comparative Example 2 having a thickness of 57 µm were obtained in the same manner as in Example 1, except that a pigment dispersion (5 wt % in DMAc, OP-130A, Toyoink) having an average particle size of the pigment in the dispersion of 151 nm was used. The physical properties are shown in the following Table 1.

Comparative Example 3

Preparation of Composition for Forming Polyimide Film
An agitator in which a nitrogen stream flowed was filled with 253 g of N,N-dimethylpropionamide (DMPA), and Referring to the above Table 1, it was confirmed that the polyimide film according to an exemplary embodiment (Example 1) may have both improved haze and yellow index, since the pigment dispersion having the average particle size of the inorganic pigment of 10 to 100 nm and the monomer were added together, in the step of polymerizing the polyamic acid and/or the polyimide.

Furthermore, it was confirmed that the polyimide film manufactured from Example 2 further included the inorganic nanoparticles and the polyfunctional (meth)acryl-based compound as an additive, thereby implementing better optical properties.

However, it was confirmed that though the same pigment dispersion as Examples 1 and 2 was used, in the composition for forming a polyimide film manufactured from Comparative Example 1, the pigment was unable to be dispersed at all, since the pigment dispersion was added after the polymerization of polyamic acid and/or polyimide ((c) of FIG. 1).

In addition, in Comparative Example 2 using the pigment dispersion having an average particle size of 151 nm of the pigment in the dispersion, pigment dispersibility was deteriorated, the optical properties to be desired were not able to be implemented after curing.

The method of preparing a composition for forming a polyimide film according to an exemplary embodiment may make dispersibility of a pigment in the composition excellent. Accordingly, a polyimide film having a significantly improved yellow index without deteriorating light transmittance and haze properties may be provided.

In addition, the polyimide film according to an exemplary embodiment may implement colorless and transparent optical properties even in a thickness range having mechanical strength similar to tempered glass, reduce a rainbow phenomenon causing iridescent stains, or the like, and thus, secure visibility.

In addition, the polyimide film according to an exemplary embodiment also has excellent bending properties, thereby preventing breakage or cracks by bending.

That is, the polyimide film according to an exemplary embodiment may have significantly improved display quality and visibility due to excellent optical properties, and also, have excellent flexibility and mechanical properties, and thus, may be usefully applied as an optical application such as a foldable display device or a flexible display device.

Hereinabove, an exemplary embodiment has been described by specific examples, this has been provided only for assisting in the entire understanding of the present invention, and the present invention is not limited to the examples. Various modifications and changes may be made by those skilled in the art to which the present invention pertains from this description.

Therefore, the spirit of the present invention should not be limited to the above-described exemplary embodiments, and the following claims as well as all modified equally or equivalently to the claims are intended to fall within the scope and spirit of the invention.

The invention claimed is:

1. A method of preparing a composition for forming a polyimide film, the method comprising:
   adding a pigment dispersion comprising a blue-based inorganic pigment having a maximum absorption wavelength of 520 to 650 nm and a dispersing agent to an organic solvent to form a mixed solution, wherein an average particle size of the inorganic pigment in the pigment dispersion is 10 to 95 nm;
   dissolving a diamine in the mixed solution;
   reacting a dianhydride with the diamine in the mixed solution to form a polyamic acid resin; and
   adding a polyfunctional (meth)acryl-based compound after forming the polyamic acid resin.

2. The method of preparing a composition for forming a polyimide film of claim 1, wherein a solid phase average particle size of the inorganic pigment is 10 to 70 nm.

3. The method of preparing a composition for forming a polyimide film of claim 2, wherein the inorganic pigment is comprised at 10 to 1,500 ppm, based on a polyamic acid solid content.

4. The method of preparing a composition for forming a polyimide film of claim 2, wherein the pigment dispersion comprises the inorganic pigment and the dispersing agent at a weight ratio of 1:0.01 to 1:1.

5. The method of preparing a composition for forming a polyimide film of claim 2, wherein the blue-based inorganic pigment comprises a natural mineral; or one or more metals selected from zinc, titanium, lead, iron, copper, chromium, cobalt, molybdenum, manganese, and aluminum, or metal oxides thereof.

6. The method of preparing a composition for forming a polyimide film of claim 1, wherein the polyamic acid resin comprises a structural unit derived from the diamine and a structural unit derived from the dianhydride.

7. The method of preparing a composition for forming a polyimide film of claim 1, further comprising: adjusting viscosity by further adding an organic solvent so that the following Relation 1 is satisfied, after the preparing of the polyamic acid resin in the presence of the pigment dispersion:

$$5,000 \leq V_{PI} \leq 40,000 \qquad \text{[Relation 1]}$$

wherein $V_{PI}$ is a viscosity of the composition for forming a polyimide film when a solid content is 14 wt % with respect to a total weight of the composition for forming a polyimide film, and the viscosity is a viscosity (unit, cp) measured based on 80% torque for 2 minutes using a 52Z spindle at 25° C. with a Brookfield rotational viscometer.

8. The method of preparing a composition for forming a polyimide film of claim 1, further comprising: adding an additive, after the preparing of the polyamic acid resin.

9. The method of preparing a composition for forming a polyimide film of claim 8, wherein the additive comprises inorganic nanoparticles.

10. The method of preparing a composition for forming a polyimide film of claim 9, wherein an average particle diameter of the inorganic nanoparticles is 5 to 50 nm.

11. The method of preparing a composition for forming a polyimide film of claim 9, wherein the inorganic nanoparticles comprise silica, zirconium oxide, titanium oxide, zinc oxide, zinc sulfide, chromium oxide, barium titanate, or a combination thereof.

12. The method of preparing a composition for forming a polyimide film of claim 1, wherein the polyfunctional (meth)acryl-based compound further comprises an alkylene group, an ether group, a urethane group, an ester group, or a combination thereof.

13. A composition for forming a polyimide film prepared by the method of claim 1.

14. A polyimide film obtained by curing the composition for forming a polyimide film of claim 13.

15. The polyimide film of claim 14, wherein the polyimide film has a thickness of 20 to 500 μm, a haze in accordance with ASTM D1003 of 2 or less, and a yellow index (YI) in accordance with ASTM E131 of 8 or less.

16. The polyimide film of claim 14, wherein the polyimide film has a modulus in accordance with ASTM E111 of 5 GPa or more.

17. An image display device comprising the polyimide film of claim 14.

18. The method of preparing a composition for forming a polyimide film of claim 1, wherein the average particle size of the inorganic pigment in the pigment dispersion is 10 to 90 nm.

* * * * *